United States Patent Office 2,763,662
Patented Sept. 18, 1956

2,763,662

ORGANIC COMPOUNDS AND THEIR PREPARATION

Sydney Archer, Delmar, N. Y., assignor to Sterling Drug Inc., New York, N. Y., a corporation of Delaware No Drawing. Original application September 20, 1954, Serial No. 457,281. Divided and this application September 29, 1955, Serial No. 537,554

16 Claims. (Cl. 260—309.5)

This invention relates to isonicotinoylhydrazones of 5-(oxoalkyl)-2-thiohydantoins and to their preparation, to the parent 5-(oxoalkyl)-2-thiohydantoins and to their preparation, and to the preparation of intermediate 2-amino-oxoalkanoic acids.

This application is a division of my copending application Serial No. 457,281, filed September 20, 1954.

The 5-(oxoalkyl)-2-thiohydantoin isonicotinoylhydrazones of my invention have the formula

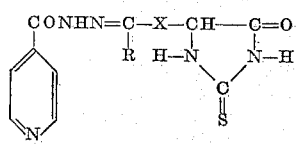

where R is an alkyl radical and X is an alkylene radical, the total number of carbon atoms in R and X together being no greater than twelve. These compounds, in either the acid or salt form, are useful as chemotherapeutic agents, in particular, for their antitubercular properties.

The alkyl radical designated above as R has from one to eleven carbon atoms and includes radicals such as methyl, ethyl, propyl, isopropyl, n-butyl, isoamyl, n-hexyl, n-octyl, n-decyl, n-undecyl, and the like. The alkylene radical designated above as X has from one to eleven carbon atoms and includes radicals such as —CH$_2$—, —CH$_2$CH$_2$—, —CH$_2$CH(CH$_3$), —CH$_2$CH$_2$CH$_2$—,
—CH$_2$CH(CH$_3$)CH$_2$—, —CH$_2$C(CH$_3$)$_2$CH$_2$—, —CH$_2$(CH$_2$)$_4$CH$_2$—,
—CH$_2$(CH$_2$)$_6$CH$_2$—, —CH$_2$(CH$_2$)$_8$CH$_2$—, —CH$_2$(CH$_2$)$_9$CH$_2$— and the like.

The 5-(oxoalkyl)-2-thiohydantoin isonicotinoylhydrazones of my invention were prepared by reacting isonicotinoylhydrazine with a 5-(oxoalkyl)-2-thiohydantoin having the formula

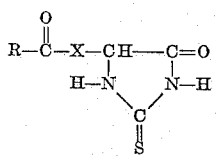

where R and X are defined as hereinabove. This condensation reaction was carried out preferably by heating isonicotinoylhydrazine with the appropriate 5-(oxoalkyl)-2-thiohydantoin in a polar solvent, preferably a lower alkanol such as methanol, ethanol, isopropanol, etc. The temperature for carrying out this condensation reaction is not critical and is limited only by the boiling point of the solvent used and by the decomposition temperature of the reactants, i. e., several hundred degrees centigrade. In the same way the lower temperature limit is not critical, for example the reaction can be carried out in a polar solvent at room temperature, although the reaction then proceeds more slowly.

The 5-(oxoalkyl)-2-thiohydantoin isonicotinoylhydrazones of my invention can be used in either the free acid form or in the form of their salts with relatively non-toxic cations such as sodium, potassium, calcium, magnesium, ammonium, ethanolammonium, and the like. The usefulness of these isonicotinoylhydrazones was established by experiments in Swiss mice which were infected intravenously with large inocula of virulent human-type tubercle bacilli. The oral administration of my compounds resulted in prolongation of survival time, suppression of tuberculous lesions in the lungs, and inhibition of the multiplication of tubercle bacilli.

My invention also comprehends the above-described 5-(oxoalkyl)-2-thiohydantoins having the formula

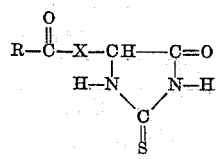

where R and X have the meanings given hereinabove. These compounds are useful as intermediates in the preparation of my above described 5-(oxoalkyl)-2-thiohydantoin isonicotinoylhydrazones and, in addition, some of them, especially those where X is CH$_2$, in either the acid or salt form are useful as chemotherapeutic agents, in particular, for their antitubercular properties.

I prepared these 5-(oxoalkyl)-2-thiohydantoins by heating a 2-amino-oxoalkanoic acid having the formula

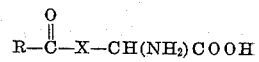

with a water-soluble inorganic thiocyanate and a lower alkanoic acid anhydride, preferably in the presence of a lower alkanoic acid, and thereafter deacylating the corresponding 1-acyl-5-(oxoalkyl)-2-thiohyantoin by heating it with a strong hydrolyzing agent, namely, a strong base or a strong mineral acid to remove the 1-acyl group. The heating is normally done in the range of about 50 to 150° C. From the standpoint of convenience, accessibility and economy, acetic anhydride and acetic acid are preferred as the lower alkanoic acid anhydride and lower alkanoic acid, respectively; hydrochloric acid, as the strong mineral acid; sodium hydroxide, as the strong base; and ammonium thiocyanate, as the water-soluble inorganic thiocyanate. The 5-(oxoalkyl)-2-thiohydantoins of my invention can be prepared in the absence of a lower alkanoic acid, e. g., acetic acid, although less desirably.

The 5-(oxoalkyl)-2-thiohydantoins of my invention can be used in either the free acid form or in the form of their salts with relatively non-toxic cations such as sodium, potassium, calcium, magnesium, ammonium, ethanolammonium, and the like. Therapeutic usefulness of these thiohydantoins where X is CH$_2$, i. e., the 2-oxoalkyl compounds, was established by experiments in Swiss mice which were infected intravenously with large inocula of virulent human-type tubercle bacilli. The oral administration of my compounds resulted in prolongation of survival time, suppression of tuberculous lesions in the lungs, and inhibition of the multiplication of tubercle bacilli.

My invention further comprehends the process for the preparation of the intermediate 2-amino-oxoalkanoic acids having the formula

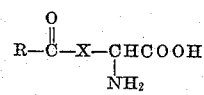

where R and X have the meanings given hereinabove. I prepared these intermediate amino-keto acids by heating in an acidic medium a di-(lower alkyl) alpha-acyl-amido-alpha-(oxoalkyl)malonate having the formula

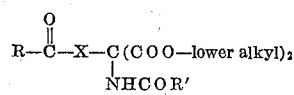

where the two lower alkyl radicals each have from one to six carbon atoms inclusive and R' is a lower alkyl radical having from one to five carbon atoms inclusive. The heating is normally done in the range of about 50 to 150° C.

The intermediate di-(lower alkyl) alpha-acylamido-alpha-(oxoalkyl)malonates can be prepared by various procedures. One procedure that I found useful in preparing these esters was the reaction of an oxoalkyl halide,

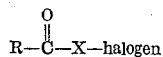

where halogen is preferably chlorine or bromine, with an alkali metal derivative, e. g., Na or Li, of a di-(lower alkyl) alpha-acylamidomalonate, obtainable for instance as described in U. S. Patent 2,521,809. The alkali metal derivative can be prepared by reaction of the substituted-malonate with an alkali metal per se, or its alkoxide, hydride, amide or organometallic derivative, e. g., alkali metalaryl such as lithiumphenyl. The procedure is illustrated by the following equation where the two lower alkyl radicals are ethyl:

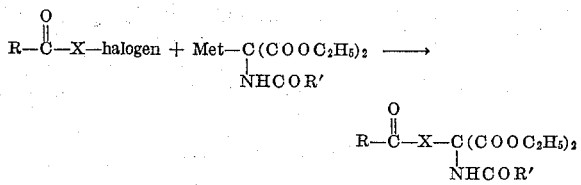

where Met is an alkali metal cation. The oxoalkyl halides, or 1-halo-alkanones,

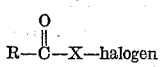

can be prepared different ways. In preparing these intermediates, I reacted a cadmium dialkyl, Cd(R)₂ (obtained from the corresponding Grignard reagent), with the appropriate haloalkanoyl halide, halogen-X-CO-halogen, e. g., chloroacetyl chloride where X is CH₂ and each halogen is chlorine. The haloalkanoyl halides can be prepared various ways well known in the art, e. g., by reaction of thionyl halide and the haloalkanoic acid available as given in "Traite de Chimie Organique," volume IX, pages 145 ff., edited by Grignard et al. (Masson et Cie., Paris, 1939).

A useful method for the preparation of the intermediate di-(lower alkyl) alpha-acylamido-alpha-(3-oxoalkyl)-malonates, that is, where X is CH₂CH₂, is the reaction of an alkyl vinyl ketone (or 1-alken-3-one) with a di-(lower alkyl) alpha-acylamidomalonate, as illustrated by the following equation where the two lower alkyl radicals are each ethyl:

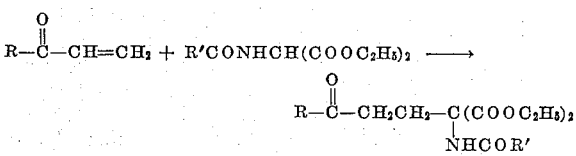

The alkyl vinyl ketones were prepared by reacting an alkanoyl halide, e. g., ROCOl, with ethylene to produce a 3-oxoalkyl halide, e. g., RCOCH₂CH₂Cl, and then dehydrohalogenating the 3-oxoalkyl halide. A process of preparing these alkyl vinyl ketones where alkyl is lower-alkyl is disclosed and claimed in the copending Archer and Dickinson U. S. patent application S. N. 333,818, filed January 28, 1953.

My invention is further illustrated as follows without, however, limiting it thereto.

EXAMPLE 1

A. *Intermediate 2-amino-oxoalkanoic acids*

*1-halo-alkanones.*—The preparation of these halo ketones is illustrated by the following preparation of 1-chloro-2-nonanone: The Grignard reagent was prepared from 48.8 g. of magnesium and 358 g. of n-heptyl bromide in one liter of ether. The solution was chilled to 5° C., and an additional liter of ether was added, followed by portionwise addition of 196 g. of cadmium chloride. The mixture was allowed to warm slowly to about 50–60° C. and then refluxed for one hour. About two liters of benzene was added and the condenser was set for downward distillation. The ether was then removed by distillation while benzene was added, keeping the volume constant throughout the distillation. When the temperature of the solution had reached 78° C., it was cooled to 10° C. and was treated with a solution of 226 g. of chloroacetyl chloride in 400 ml. of benzene, this addition being made as rapidly as possible. The temperature rose rapidly to 25° C. and more slowly to 50° C. The reaction mixture was then stirred for two hours. It was poured into a mixture of ice and dilute sulfuric acid and the resulting layers were separated. The aqueous phase was washed with benzene and the benzene washings were added to the benzene layer. The resulting benzene solution was washed successively with water, saturated sodium bicarbonate solution, water and finally with saturated sodium chloride solution. The benzene solution was dried over anhydrous calcium sulfate and distilled in vacuo to yield a residue which was then distilled under reduced pressure. This distillation yielded 140.8 g. of 1-chloro-2-nonanone, B. P. 67–71° C. at 0.3 mm.; $n_D^{25}$, 1.4448.

*Analysis.*—Calcd. for $C_9H_{17}ClO$: Cl, 20.01. Found: Cl, 19.90.

Other 1-chloro-2-alkanones prepared following the above procedure are given in Table I.

TABLE I

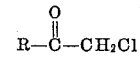

| R | Yield, Percent | B. P., ° C. |
|---|---|---|
| n-C₈H₁₇ | 33 | 78–79° at 0.2 mm. |
| n-C₉H₁₃ | 47.5 | 57–62° at 0.1 mm. |
| n-C₆H₁₁ | 43.5 | 50–57° at 1.5 mm. |
| n-C₉H₁₉ | 27.5 | 85° at 1 mm. |
| n-C₄H₉ | 40 | M.P. 38–39° |

Other 1-halo-alkanones that can be prepared according to the foregoing procedure using the appropriate reactants include 1-chloro-2-pentanone, 1-chloro-8-methyl-2-nonanone, 1-chloro-7-methyl-2-octanone, 1-chloro-2-dodecanone, 1-bromo-4-hexanone, 1-chloro-12-tridecanone, 1-chloro-8-nonanone, 1-chloro-6-nonanone, and the like.

*2-amino-oxoalkanoic acids.*—The preparation of these compounds is illustrated by the following preparation of 2-amino-4-oxoundecanoic acid: Phenyllithium was prepared from 14.7 g. of lithium wire (suspended in 250 ml. of ether) and 157 g. of bromobenzene in 500 ml. of ether. The solution was filtered and 217 g. of diethyl alpha-acetamidomalonate in 100 ml. of benzene was added. The ether was removed by distillation. A solution of 140.8 g. of 1-chloro-2-nonanone in 200 ml. of benzene was added and the mixture was refluxed for sixteen hours. The lithium halides formed in the reactions were filtered off and the solvent removed by distilling in vacuo. The residue was refluxed for sixteen hours with 1500 ml. of 6 N hydrochloric acid. The mixture was chilled and the 2-amino-4-oxoundecanoic acid hydrochloride that separated was collected on a filter and washed thoroughly with ether. This amino acid hydrochloride was dissolved in ethanol, the solution made faintly alkaline with ammonium and the alkaline solution chilled. The free amino acid that separated was filtered, washed successively with water, acetone and ether, yielding 76.5 g. of product, 2-amino-4-oxoundecanoic acid. A sample recrystallized from water melted at 190–191° C.

*Analysis.*—Calcd. for $C_{11}H_{21}NO_3$: N, 6.51. Found: N, 6.48.

Other 2-amino-4-oxoalkanoic acids prepared according to the foregoing procedure are given in Table II.

TABLE II

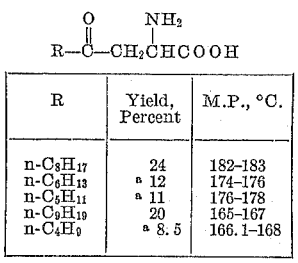

| R | Yield, Percent | M.P., °C. |
|---|---|---|
| n-$C_8H_{17}$ | 24 | 182–183 |
| n-$C_6H_{13}$ | a 12 | 174–176 |
| n-$C_5H_{11}$ | a 11 | 176–178 |
| n-$C_9H_{19}$ | 20 | 165–167 |
| n-$C_4H_9$ | a 8.5 | 166.1–168 | a Sodium derivative of diethyl alpha-acetamidomalonate used; it was prepared by reacting sodium ethoxide with diethyl alphaacetamidomalonate in ethanol solution.

Other 2-amino-oxoalkanoic acids that can be prepared according to the above procedure include 2-amino-4-oxopentanoic acid, 2-amino-4-oxoheptanoic acid, 2-amino-10-methyl-4-oxoundecanoic acid, 2 - amino-9-methyl-4-oxodecanoic acid, 2-amino - 4 - oxotetradecanoic acid, 2-amino-6-oxooctanoic acid, 2 - amino - 14 - oxopentadecanoic acid, 2-amino-10-oxoundecanoic acid, 2-amino-8-oxoundecanoic acid, and the like.

In the preparation of my intermediate 2-amino-4-oxoalkanoic acids the foregoing procedure can be modified by using potassium in place of lithium or sodium, and by using other lower alkyl esters of other alpha-(lower carboxylic acylamido)-malonic acids in place of diethyl alpha-acetamidomalonate.

B. 5-(oxoalkyl)-2-thiohydantoins

The preparation of these compounds is illustrated as follows for the preparation of 5-(2-oxononyl)-2-thiohydantoin: A mixture of 21.5 g. of 2-amino-4-oxoundecanoic acid, 13.35 g. of ammonium thiocyanate, 60 ml. of acetic anhydride and 6.7 ml. of acetic acid was refluxed with stirring for twenty minutes, and then poured into ice water. The solid N-acetyl derivative that separated was collected and boiled for forty minutes with a mixture containing 44.5 ml. each of water, ethanol and concentrated hydrochloric acid. The mixture was chilled and the product collected. Two crystallizations of this product from ethanol yielded about 16.5 g. of 5-(2-oxononyl)-2-thiohydantoin, M. P. 104.0–108.9° C. (corr.).

*Analysis.*—Calcd. for $C_{12}H_{20}N_2O_2S$: N, 10.93; S, 12.51. Found: N, 10.94; S, 12.61.

Other 5-(2-oxoalkyl)-2-thiohydantoins prepared according to the foregoing procedure are given in Table III.

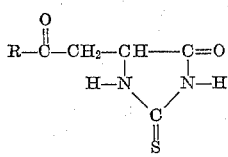

| R | M. P., °C. (corr.) | Analysis | | | |
|---|---|---|---|---|---|
| | | Calcd. | | Found | |
| | | N | S | N | S |
| n-$C_8H_{17}$ | 110.7–112.7 | 10.36 | 11.86 | 10.35 | 12.05 |
| n-$C_9H_{19}$ | 110.3–113.0 | 9.85 | 11.27 | 9.72 | 11.12 |
| n-$C_6H_{13}$ | 98.3–100.0 | 11.53 | 13.22 | 11.53 | 13.48 |
| n-$C_5H_{11}$ | 98.2–101.2 | 12.27 | 14.04 | 12.15 | 13.77 |
| n-$C_4H_9$ | 88.7–101.3 | 13.08 | ------ | 13.11 | ------ |

Other 5-(oxoalkyl)-2-thiohydantoins that can be prepared according to the above procedure include 5-(2-oxopropyl)-2-thiohydantoin, 5 - (2 - oxopentyl) - 2 - thiohydantoin, 5-(8-methyl-2-oxononyl)-2-thiohydantoin, 5-(7-methyl-2-oxooctyl)-2-thiohydantoin, 5-(2-oxododecyl)-2-thiohydantoin, 5-(4-oxohexyl)-2-thiohydantoin, 5-(12-oxotridecyl)-2-thiohydantoin, 5 - (8 - oxononyl)-2-thiohydantoin, 5-(6-oxononyl)-2-thiohydantoin, and the like.

EXAMPLE 2

A. Intermediate 2-amino-5-oxoalkanoic acids

These intermediates were prepared according to the procedure as outlined in the specification hereinabove and as illustrated by the following series of equations:

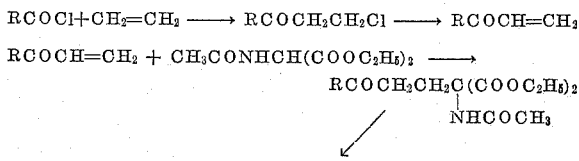

where R is defined as given hereinabove. This procedure is further illustrated by the following examples.

*1-chloro-3-alkanones.*—The preparation of these chloro ketones is illustrated by the following preparation of 1-chloro-3-octanone: A three liter three-necked flask was charged with 695 g. of chloroform and 199 g. of aluminum chloride. This mixture was cooled to —10° C. and saturated with ethylene. To this mixture was added 200 g. of caproyl chloride (n-hexanoyl chloride) in one portion and stirring at —10° C. was continued for two hours as ethylene was bubbled continuously through the mixture, which was then allowed to stand overnight. The reaction mixture was poured into ice water which had been acidified with hydrochloric acid. The aqueous layer was extracted with chloroform, and the chloroform extract was washed with water and concentrated. The residual material was distilled in vacuo yielding 72 g. of 1-chloro-3-octanone, B. P. 72–78° C. at 4.8 mm.

Other 1-chloro-3-alkanones that were prepared according to the foregoing procedure include 1-chloro-3-heptanone, B. P. 72–79° C. at 10 mm. and 1-chloro-3-hexanone, B. P. 57–63° C. at 9 mm.

Other 1-chloro-3-alkanones that can be prepared following the above procedure include 1-chloro-3-butanone, 1-chloro-3-pentanone, 1-chloro-3-nonanone, 1-chloro-3-tridecanone and 1-chloro-6-methyl-3-heptanone.

*Alkyl vinyl ketones (1-alken-3-ones).*—Preparation of these unsaturated ketones is illustrated by the following preparation of n-amyl vinyl ketone (1-octen-3-one): A mixture of 72 g. of 1-chloro-3-octanone, 70.6 g. of sodium benzoate and 300 ml. of Dowtherm A (mixture of diphenyl ether and biphenyl) was charged into a flask equipped with an efficient stirrer and a condenser set for downward distillation. The distillate was collected until the temperatures of the vapors reached 210° C. It was then dried over anhydrous calcium sulfate and distilled, yielding 22 g. of n-amyl vinyl ketone, B. P. 57–62° C. at 13 mm.

Other vinyl ketones prepared according to the foregoing procedure are n-propyl vinyl ketone, B. P. 64° C. at 70 mm. and n-butyl vinyl ketone, B. P. 38–43° C. at 9 mm.

Other alkyl vinyl ketones that can be prepared according to the above procedure include methyl vinyl ketone, ethyl vinyl ketone, n-hexyl vinyl ketone, n-decyl vinyl ketone and isobutyl vinyl ketone.

*Lower alkyl alpha-(3-oxoalkyl)-alpha-acetamidomalonates.*—The preparation of these compounds is illustrated by the following preparation of diethyl alpha-acetamido-alpha-(3-oxooctyl)-malonate: To a mixture containing 54.6 g. of diethyl alpha-acetamidomalonate, 203 ml. of ethanol and 1.27 ml. of triethylamine cooled in ice was added dropwise over thirty minutes 32 g. of n-amyl vinyl ketone. The mixture was then allowed to stand at room temperature for about sixteen hours, after which time it was filtered and distilled in vacuo to remove the solvent. The crystalline residue was triturated with petroleum ether and filtered; yielding 55 g. of diethyl alpha-acetamido-alpha-(3-oxooctyl)malonate. A sample was recrystallized from petroleum ether for analysis, M. P. 60–61° C.

Analysis.—Calcd. for $C_{17}H_{29}NO_6$: N, 4.08. Found: N, 4.40.

Other diethyl alpha-acetamido-alpha-(3-oxoalkyl)malonates prepared according to the foregoing procedure are diethyl alpha-acetamido-alpha-(3-oxoheptyl)malonate (from n-butyl vinyl ketone) M. P. 62–64° C. when recrystallized from petroleum ether; and diethyl alpha-acetamido-alpha-(3-oxohexyl)malonate (from n-propyl vinyl ketone) M. P. 83–84.5° C. when recrystallized from aqueous methanol.

Other dialkyl alpha-acetamido-alpha-(3-oxoalkyl)malonates that can be prepared according to the above procedure include di-n-butyl alpha-acetamido-alpha-(3-oxobutyl)malonate, di-n-propyl alpha-acetamido-alpha-(3-oxopentyl)malonate, diethyl alpha-acetamido-alpha-(3-oxononyl)malonate, diethyl alpha-acetamido-alpha-(3-oxotridecyl)malonate and diethyl alpha-acetamido-alpha-(6-methyl-3-oxoheptyl)malonate.

*2-amino-5-oxoalkanoic acids.*—These intermediate acids were prepared from the corresponding dialkyl alpha-acetamido-alpha-(3-oxoalkyl)malonates according to the procedure as illustrated as follows for the preparation of 2-amino-5-oxodecanoic acid: A mixture of 27.5 g. of diethyl alpha-acetamido-alpha-(3-oxooctyl)malonate and 200 ml. of concentrated hydrochloric acid was refluxed for six hours and then concentrated to dryness by distilling in vacuo on a steam bath. The residue was dissolved in a small amount of water and the solution filtered. The filtrate was made slightly basic and was chilled. The precipitate was washed with water and acetone and then air dried, yielding 8.5 g. of 2-amino-5-oxodecanoic acid.

Other 2-amino-5-oxoalkanoic acids prepared according to the foregoing procedure are 2-amino-5-oxononanoic acid, M. P. 125–128° C. and 2-amino-5-oxooctanoic acid, M. P. 105–106° C.

Other 2-amino-5-oxoalkanoic acids that can be prepared according to the above procedure include 2-amino-5-oxohexanoic acid, 2-amino-5-oxoheptanoic acid, 2-amino-5-oxoundecanoic acid, 2-amino-5-oxopentadecanoic acid and 2-amino-8-methyl-5-oxononanoic acid.

In the preparation of the foregoing 2-amino-5-oxoalkanoic acids, other lower alkyl esters of alpha-(lower carboxylic acylamido)malonic acids can be used in place of diethyl alpha-acetamidomalonate.

B. *5-(3-oxoalkyl)-2-thiohydantoins*

These compounds were prepared following the procedure described above in Example 1B. Illustrative of these compounds are those given in Table IV.

TABLE IV

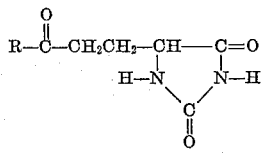

| R | M. P., °C. (corr.) | Analysis | | | |
|---|---|---|---|---|---|
| | | Calcd. | | Found | |
| | | N | S | N | S |
| n-C₅H₁₁ | 106.0–107.7 | 11.56 | 13.23 | 11.34 | 12.88 |
| n-C₃H₇ | 119.7–121.9 | 13.08 | 14.96 | 13.04 | 15.09 |
| n-C₄H₉ | 114.1–115.6 | 12.27 | 14.04 | 12.28 | 13.98 |

Other 5-(3-oxoalkyl)-2-thiohydantoins that can be prepared according to the above procedure include 5-(3-oxobutyl)-2-thiohydantoin, 5-(3-oxopentyl)-2-thiohydantoin, 5-(3-oxononyl)-2-thiohydantoin, 5-(3-oxotridecyl)-2-thiohydantoin and 5-(6-methyl-3-oxoheptyl)-2-thiohydantoin.

EXAMPLE 3

*5-(oxoalkyl)-2-thiohydantoin isonicotinoylhydrazones*

The preparation of these compounds is illustrated by the following preparation of 5-(2-oxononyl)-2-thiohydantoin isonicotinoylhydrazone: A mixture containing 12 g. of 5-(2-oxononyl)-2-thiohydantoin, 5.48 g. of isonicotinoylhydrazine and 200 ml. of methanol was refluxed for five hours. The methanol was removed by distillation in vacuo and the residue was triturated with n-hexane to yield a solid material. The solid was collected, washed with n-hexane and recrystallized twice, with charcoaling, from isopropanol, thereby yielding the product, 5-(2-oxononyl)-2-thiohydantoin isonicotinoylhydrazone, M. P. 168.5–174.9° C. (corr.).

Analysis.—Calcd. for $C_{18}H_{25}N_5O_2S$: N, 18.65; S, 8.54. Found: N, 18.61; S, 8.85.

The above reaction also can be carried out at lower temperatures, i. e., room temperature, however the reaction time is increased, and standing for a day to several days may be desirable to ensure complete reaction.

Other 5-(oxoalkyl)-2-thiohydantoin isonicotinoylhydrazones prepared according to the foregoing procedure are given in Table V.

TABLE V

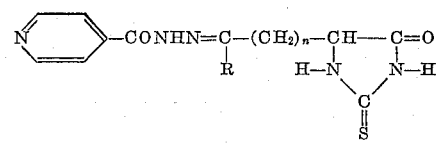

| R | n | M. P., °C. (corr.) | Analysis | | | |
|---|---|---|---|---|---|---|
| | | | Calcd. | | Found | |
| | | | N | S | N | S |
| n-C₆H₁₃ | 1 | 128.9–195.3 | 19.38 | 8.87 | 19.28 | 8.65 |
| n-C₈H₁₇ | 1 | 173.0–179.0 | 17.98 | 8.23 | 18.30 | 8.61 |
| n-C₅H₁₁ | 1 | 102.5–107.0 | 20.16 | 9.23 | 20.22 | 9.18 |
| n-C₄H₉ | 1 | 199.1–202.2 | 21.01 | 9.62 | 20.64 | 9.38 |
| n-C₅H₁₁ | 2 | 219.2–222.2 (dec.) | 19.38 | 8.87 | 19.30 | 9.05 |
| n-C₄H₉ | 2 | 237.5–238.6 | 20.16 | 9.23 | 19.99 | 9.35 |

Other 5-(oxoalkyl)-2-thiohydantoin isonicotinoylhydrazones that can be prepared according to the above procedure include 5-(2-oxoundecyl)-2-thiohydantoin isonicotinoylhydrazone, 5-(2-oxopropyl)-2-thiohydantoin isonicotinoylhydrazone, 5-(2-oxopentyl)-2-thiohydantoin isonicotinoylhydrazone, 5-(8-methyl-2-oxononyl)-2-thiohydantoin isonicotinoylhydrazone, 5-(7-methyl-2-oxooctyl)-2-thiohydantoin isonicotinoylhydrazone, 5-(2-oxododecyl)-2-thiohydantoin isonicotinoylhydrazone, 5-(4-oxohexyl)-2-thiohydantoin isonicotinoylhydrazone, 5-(12-oxotridecyl)-2-thiohydantoin isonicotinoylhydrazone, 5-(8-oxononyl)-2-thiohydantoin isonicotinoylhydrazone, 5-(6-oxononyl)-2-thiohydantoin isonicotinoylhydrazone, 5-(3-oxohexyl)-2-thiohydantoin isonicotinoylhydrazone, 5-(3-oxobutyl)-2-thiohydantoin isonicotinoylhydrazone, 5-(3-oxopentyl)-2-thiohydantoin isonicotinoylhydrazone, 5-(3-oxononyl-2-thiohydantoin isonicotinoylhydrazone, 5-(3-oxotridecyl)-2-thiohydantoin isonicotinoylhydrazone and 5-(6-methyl-3-oxoheptyl)-2-thiohydantoin isonicotinoylhydrazone,

I claim:
1. A 5-(oxoalkyl)-2-thiohydantoin having the formula

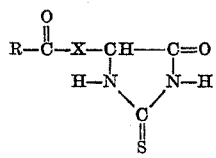

where R is an alkyl radical and X is an alkylene radical, the total number of carbon atoms in R and X together being no greater than twelve.

2. A 5-(2-oxoalkyl)-2-thiohydantoin having the formula

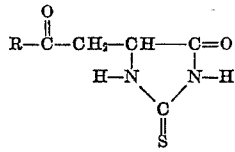

where R is an alkyl radical having one to eleven carbon atoms inclusive.

3. A 5-(3-oxoalkyl)-2-thiohydantoin having the formula

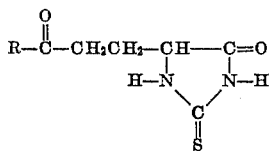

where R is an alkyl radical having one to ten carbon atoms inclusive.

4. 5-(2-oxoheptyl)-2-thiohydantoin.
5. 5-(2-oxooctyl)-2-thiohydantoin.
6. 5-(2-oxononyl)-2-thiohydantoin.
7. 5-(2-oxodecyl)-2-thiohydantoin.
8. 5-(3-oxooctyl)-2-thiohydantoin.

9. The process of preparing a 5-(oxoalkyl)-2-thiohydantoin having the formula

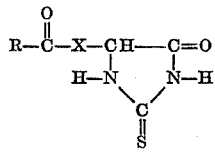

where R is an alkyl radical and X is an alkylene radical, the total number of carbon atoms in R and X together being no greater than twelve, which comprises heating an amino-keto acid having the formula

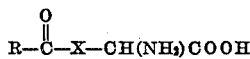

with a water-soluble inorganic thiocyanate and a lower alkanoic acid anhydride, and thereafter deacylating the corresponding 1-acyl-5-(oxoalkyl)-2-thiohydantoin.

10. The process of preparing a 5-(2-oxoalkyl)-2-thiohydantoin having the formula

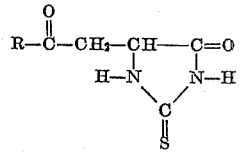

where R is an alkyl radical having one to eleven carbon atoms inclusive, which comprises heating a 2-amino-4-oxoalkanoic acid having the formula

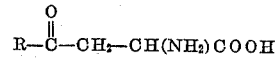

with a water-soluble inorganic thiocyanate and a lower alkanoic acid anhydride, and thereafter deacylating the resulting 1-acyl-5-(2-oxoalkyl)-2-thiohydantoin.

11. The process of preparing a 5-(3-oxoalkyl)-2-thiohydantoin having the formula

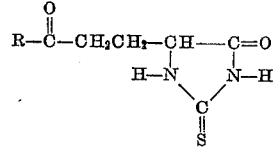

where R is an alkyl radical having one to ten carbon atoms inclusive, which comprises heating a 2-amino-5-oxoalkanoic acid having the formula

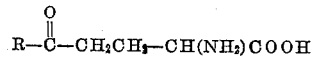

with a water-soluble inorganic thiocyanate and a lower alkanoic acid anhydride, and thereafter deacylating the resulting 1-acyl-5-(3-oxoalkyl)-2-thiohydantoin.

12. The process of preparing 5-(2-oxoheptyl)-2-thiohydantoin which comprises heating 2-amino-4-oxononanoic acid with a water-soluble inorganic thiocyanate and acetic anhydride, and thereafter deacetylating the resulting 1-acetyl-5-(2-oxoheptyl)-2-thiohydantoin.

13. The process of preparing 5-(2-oxooctyl)-2-thiohydantoin which comprises heating 2-amino-4-oxodecanoic acid with a water-soluble inorganic thiocyanate and acetic anhydride, and thereafter deacetylating the resulting 1-acetyl-5-(2-oxooctyl)-2-thiohydantoin.

14. The process of preparing 5-(2-oxononyl)-2-thiohydantoin which comprises heating 2-amino-4-oxoundecanoic acid with a water-soluble inorganic thiocyanate and acetic anhydride, and thereafter deacetylating the resulting 1-acetyl-5-(2-oxononyl)-2-thiohydantoin.

15. The process of preparing 5-(2-oxodecyl)-2-thiohydantoin which comprises heating 2-amino-4-ketododecanoic acid with a water-soluble inorganic thiocyanate and acetic anhydride, and thereafter deacetylating the resulting 1-acetyl-5-(2-oxodecyl)-2-thiohydantoin.

16. The process of preparing 5-(3-oxooctyl)-2-thiohydantoin which comprises heating 2-amino-5-oxodecanoic acid with a water-soluble inorganic thiocyanate and acetic anhydride, and thereafter deacetylating the resulting 1-acetyl-5-(3-oxooctyl)-2-thiohydantoin.

No references cited.